United States Patent
Michael et al.

(10) Patent No.: US 11,310,417 B2
(45) Date of Patent: Apr. 19, 2022

(54) STATE ESTIMATION AND LOCALIZATION FOR ROV-BASED STRUCTURAL INSPECTION

(71) Applicant: CARNEGIE MELLON UNIVERSITY, Pittsburgh, PA (US)

(72) Inventors: Nathan Michael, Pittsburgh, PA (US); Tabitha Edith Lee, Pittsburgh, PA (US); Curtis Boirum, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 149 days.

(21) Appl. No.: 16/610,647

(22) PCT Filed: May 3, 2018

(86) PCT No.: PCT/US2018/030996
§ 371 (c)(1),
(2) Date: Nov. 4, 2019

(87) PCT Pub. No.: WO2018/204726
PCT Pub. Date: Nov. 8, 2018

(65) Prior Publication Data
US 2020/0068125 A1 Feb. 27, 2020

Related U.S. Application Data

(60) Provisional application No. 62/602,711, filed on May 4, 2017.

(51) Int. Cl.
*G06K 9/78* (2006.01)
*H04N 5/232* (2006.01)
(Continued)

(52) U.S. Cl.
CPC ......... *H04N 5/23229* (2013.01); *B60R 11/04* (2013.01); *G06T 7/207* (2017.01); *G06T 7/74* (2017.01); *G21C 17/013* (2013.01)

(58) Field of Classification Search
CPC ........... H04N 5/23229; H04N 5/23299; H04N 5/23261; G06T 7/207; G06T 7/74;
(Continued)

(56) References Cited

U.S. PATENT DOCUMENTS

| 5,809,099 A | 9/1998 | Kim et al. |
| 6,108,597 A | 8/2000 | Kirchner et al. |

(Continued)

OTHER PUBLICATIONS

International Search Report and Written Opinion for International Application No. PCT/US2018/030996, dated Jul. 27, 2018.
(Continued)

*Primary Examiner* — Patrick E Demosky
(74) *Attorney, Agent, or Firm* — Kacvinsky Daisak Bluni PLLC

(57) ABSTRACT

A vision-based state estimation framework to estimate the state of an underwater remotely operated vehicle (ROV) used for inspection of an underwater structure, for example, a nuclear reactor pressure vessel. The framework employs an external overhead, pan-tilt-zoom (PTZ) camera as the primary sensing modality and incorporates prior knowledge of the geometry of the structure.

21 Claims, 5 Drawing Sheets

(51) Int. Cl.
*G06T 7/207* (2017.01)
*G06T 7/73* (2017.01)
*B60R 11/04* (2006.01)
*G21C 17/013* (2006.01)

(58) Field of Classification Search
CPC . G06T 7/11; G06T 7/246; G06T 7/248; G06T 7/40; G06T 7/70; B60R 11/04; G21C 17/013; G01S 3/00; G01S 3/781; G06K 9/6267; G06K 9/481; G06K 9/00624; G06K 9/6202; G06K 9/78; G06K 9/6296; G06K 9/00664; G06K 9/0063; A61B 34/30; A61B 34/20; A61B 34/32; A61B 90/17; A61B 34/10; G16H 30/40; G16H 30/20; G16H 50/20; G05D 1/0272; G05D 1/0246; G05D 1/0094; G05D 1/0038; G05D 1/12; G05D 1/0088; G06F 3/04883; B64C 39/024; G08G 5/0069
See application file for complete search history.

(56) References Cited

U.S. PATENT DOCUMENTS

| | | | |
|---|---|---|---|
| 9,164,506 B1* | 10/2015 | Zang | B64D 47/08 |
| 2005/0182518 A1* | 8/2005 | Karlsson | G05D 1/0272 |
| | | | 700/253 |
| 2006/0222209 A1 | 10/2006 | Zhang et al. | |
| 2010/0080415 A1* | 4/2010 | Qureshi | G06K 9/481 |
| | | | 382/103 |
| 2016/0082597 A1* | 3/2016 | Gorshechnikov | B25J 9/1664 |
| | | | 700/253 |
| 2016/0198074 A1* | 7/2016 | Boyle | G06T 1/0007 |
| | | | 348/81 |
| 2016/0307333 A1 | 10/2016 | Qureshi et al. | |
| 2017/0004371 A1 | 1/2017 | Getz et al. | |
| 2017/0050563 A1* | 2/2017 | Bosscher | H04N 5/23299 |

OTHER PUBLICATIONS

Extended European Search Report for Application No. EP18794031.7, dated Dec. 16, 2020, 6 pages.

* cited by examiner

STATE ESTIMATION AND LOCALIZATION FOR ROV-BASED STRUCTURAL INSPECTION

RELATED APPLICATIONS

This application claims the benefit of U.S. Provisional Patent Application Ser. No. 62/602,711, filed May 4, 2017.

BACKGROUND OF THE INVENTION

The use of vision for localizing underwater robots has been studied both in research experiments and in deployed field robots. Submersible robots, for example, remotely-operated vehicles (ROVs), typically utilize a range of sensor modalities, but the choice of sensor modalities may be restricted in environments with challenging conditions. As an example, walls of nuclear reactor containment vessels must be periodically inspected to ensure integrity. However, the existence of radiation in this environment may constrain the use of other sensors that could otherwise provide accurate localization, for example, inertial measurement units, gyroscopes, or depth sensors. Radiation-sensitive electronics can degrade and fail with exposure of a few kRad, which is often below the expected exposure dosage in this setting. The underwater setting and the radiation shielding provided by the vessel may also exclude the use of GPS, and water attenuation excludes sensing depth using projective infrared light without the use of an external light source. However, the underwater setting, in most cases, lacks turbidity, and thus vision-based perception is viable.

As such, systems where vision is a primary sensor modality for localization or inspection are preferred. Therefore, it would be desirable to be able to provide state estimation and localization using a visual modality in this very challenging environment.

SUMMARY OF THE INVENTION

The invention consists of a tightly integrated combination of software and hardware components that form a system to address the problem of robot localization for the ROV-based inspection of nuclear reactor pressure vessels. This is important because ROVs used for this purpose may not be visible to the operator, or may be automatically controlled based on feedback from this system. Underwater cameras exist for nuclear reactor inspection, but they are typically only used for human monitoring by inspection personnel. In contrast, the present invention couples the camera with underlying algorithms to provide an automated capability for localization of ROVs used for vessel inspection.

The system consists of computer vision and state estimation algorithms coupled with an underwater pan-tilt-zoom (PTZ) camera. The invention estimates the position and orientation of a remotely operated vehicle, for example, a tethered, submersible robot, that inspects an underwater structure. The system is particularly useful for the inspection of the walls of a nuclear reactor pressure vessel.

The present invention solves the sensor constraint issue by utilizing a variable focal length camera. The camera may be positioned above the vessel, away from the radiation-emitting walls, and utilize zoom to compensate for its position. This yields a high optical resolution image suitable for processing with the software algorithms, while mitigating camera exposure to radiation.

The invention is able to localize the robot within the highly irradiated environment of a nuclear reactor pressure vessel, particularly when the robot is in close proximity to the vessel wall. Due to extreme radiation emitting from the walls, only the most hardened electronics are viable when in close proximity to the walls, and these electronics are typically prone to image noise or are otherwise difficult to utilize in an automated context. However, operating in close proximity to the vessel walls is imperative for the robot to inspect the structure.

The present invention has several advantages over existing camera-based systems and methodologies due to its tightly coupled design between the camera hardware and the software algorithms. The ROV can be automatically tracked through visual serving to keep the robot in view, obviating the need for inspection personnel to manually control the external camera. Additionally, the system is capable of a self-initialization procedure, requiring minimal input from inspection personnel. This removes the need for technical domain experts to start the system. The system is also self-calibrating, using an initial known map of the geometry of the structure. The camera algorithms extract lines and points from the scene, inferring the position and orientation of the camera itself. Lastly, the invention has automated failure detection. The software will detect when ROV tracking is lost, or when the uncertainty in the estimated camera or ROV position and orientation becomes unreasonable. In these cases, the system automatically takes corrective action, such as suspending tracking and attempting to re-acquire the ROV. Additionally, camera maneuvers may be performed to increase the belief state of the camera.

DETAILED DESCRIPTION

Figure 1A:
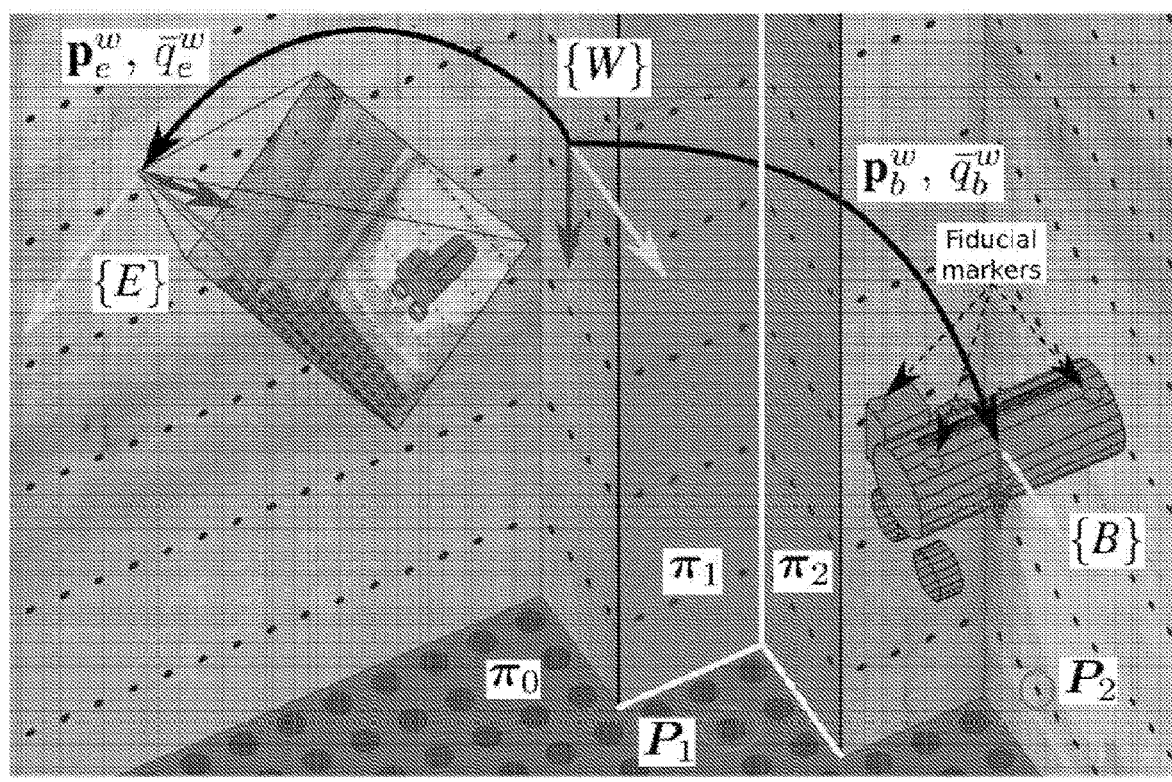
FIG. 1A shows a system representation of landmarks in three dimensions.

Note that, as used herein, the terms, "vehicle", "remotely-operated vehicle", "ROV" and "robot" are used interchangeably and refer to the vehicle being localized. Also, as used herein, the terms "pan-tilt-zoom", "PTZ" and "camera" are used interchangeably, and refer to the external camera used for image capture for purposes of localization of the robot, and not a camera or cameras which may be mounted on the robot and used for capturing images of the structure being inspected.

The invention uses a vision-based state estimation and localization framework to enable submersible robots to conduct precision inspection of nuclear reactor pressure vessels and other underwater structures. The framework is formulated as an extended Kalman filter (EKF) that is robust to sensor degradation and image corruption that may occur due to environmental effects, such as radiation and color attenuation. The proposed framework relies on a pan-tilt-zoom (PTZ) camera that is autonomously controlled. To model the structure, a sparse geometric map that concisely represents the geometry of the structure as a series of planes and landmarks is used. The map is assumed as being known in advance with limited uncertainty arising from differences between engineering blueprints and actual construction. The map is added to the state to enable updates based on projections of lines and landmarks on the map by the camera.

The computer vision algorithms extract landmarks (i.e., points and lines) from images of the vessel, as well as fiducial markers mounted on the ROV. These observations are then utilized by the state estimation framework to estimate the position and orientation of the camera and ROV with respect to the vessel, which is represented by the system mapping component as a series of intersecting planes and coincident landmarks.

Preferably, the camera is mounted in a waterproof housing, designed to be submersible to at least 10 m. A transparent hemisphere is mounted to the bottom of the housing to enable viewing at various camera angles. Preferably, the housing will be submerged under the surface of the water and will be locked in a fixed position.

In preferred embodiments, the camera housing is fabricated from aluminum and anodized to prevent corrosion from radiation. The housing uses a high precision transparent acrylic hemisphere to allow for the camera to view the scene at nearly the full range of pan and tilt angles, with minimal optical distortion. The housing further uses a pressurization system which enables the housing to be purged with nitrogen gas and kept at a positive pressure to aid with preventing the ingress of water in the event of a housing structural failure. In this event, bubbles will be produced at the leak site, allowing for visual identification of this failure mode.

Preferably, a diopter (i.e., close-up) lens is installed on the PTZ camera to compensate for the adverse optical effects of underwater spherical lenses (i.e., light refraction), which causes a reduction in focal length.

The submersible robot that is used to inspect structure may be, in certain embodiments, an underwater ROV having a planar structure. The robot is preferably equipped with at least three fiducial markers that are used for pose estimation. A tether may be used to remotely transmit control signals to the robot.

Figure 1B:
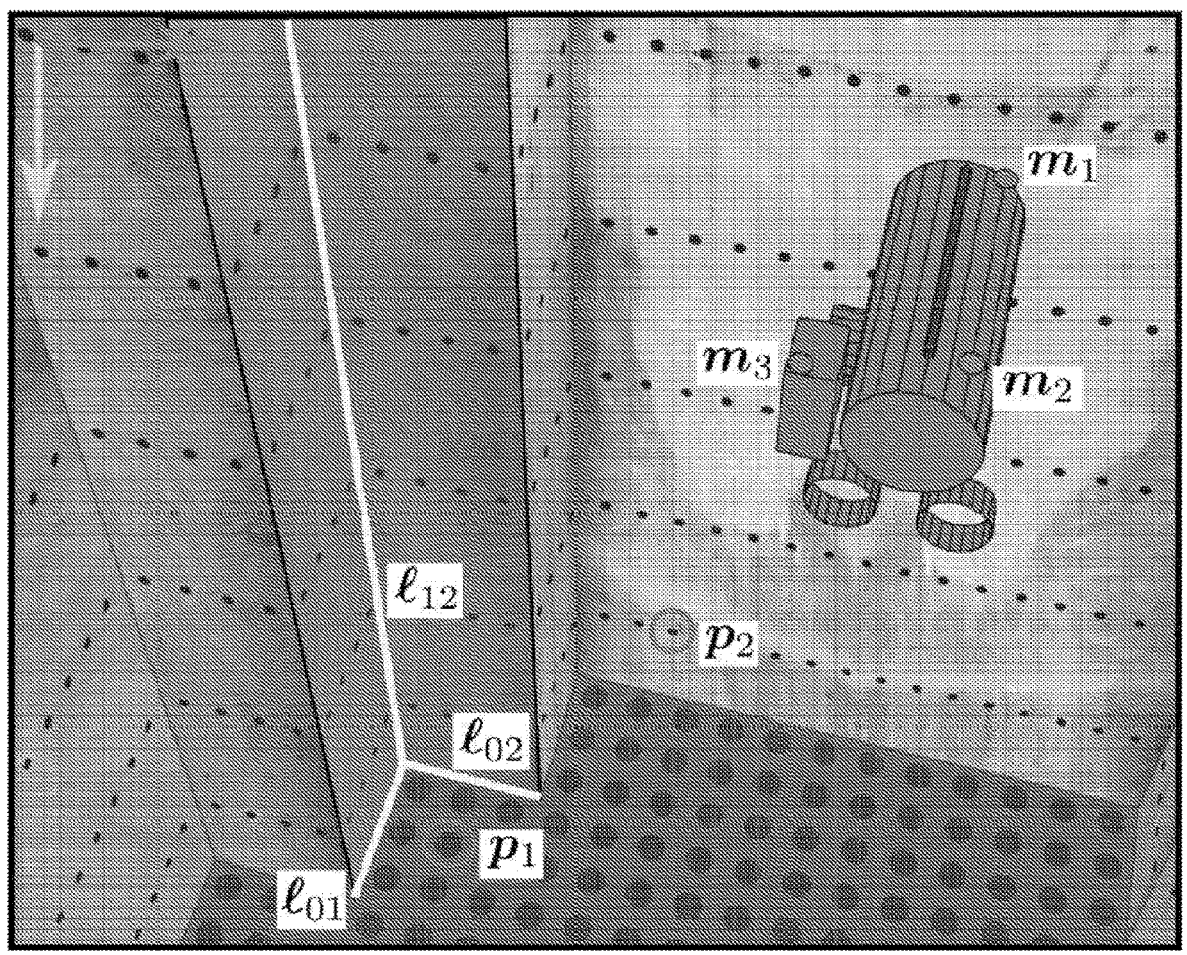
FIG. 1B shows a representation of landmarks in the two-dimensional image space of the external camera.

FIGS. 1(A-B) illustrate the system and depict three distinct reference frames
1. the body frame $\{B\}$, located at the robot center of mass;
2. the external camera frame $\{E\}$, located at the optical center of the camera; and
3. the inertial world frame $\{W\}$, which is the reference frame for the structure map.

The pose of the robot is estimated via an EKF with a state that also includes the pose and focal length of the PTZ camera. To account for uncertainties in the geometry of the structure, a representation of the structure as a sparse map is included in the framework. The framework is detailed in FIG. 2.

External PTZ Camera—The PTZ camera utilized to monitor the robot and vessel during inspection of the structure is mounted to the structure, external to the robot. The camera is controlled via visual serving such that the robot is always in view with reasonable magnification. The PTZ images are used for inference of camera motion and intrinsic change due to zoom, camera-to-robot localization and camera-to-world localization using projections of structural landmarks in the image space. Pinhole projection is assumed as the underlying camera model:

$$K = \begin{bmatrix} f_x & 0 & c_x \\ 0 & f_y & c_y \\ 0 & 0 & 1 \end{bmatrix} \quad (1)$$

Figure 4:
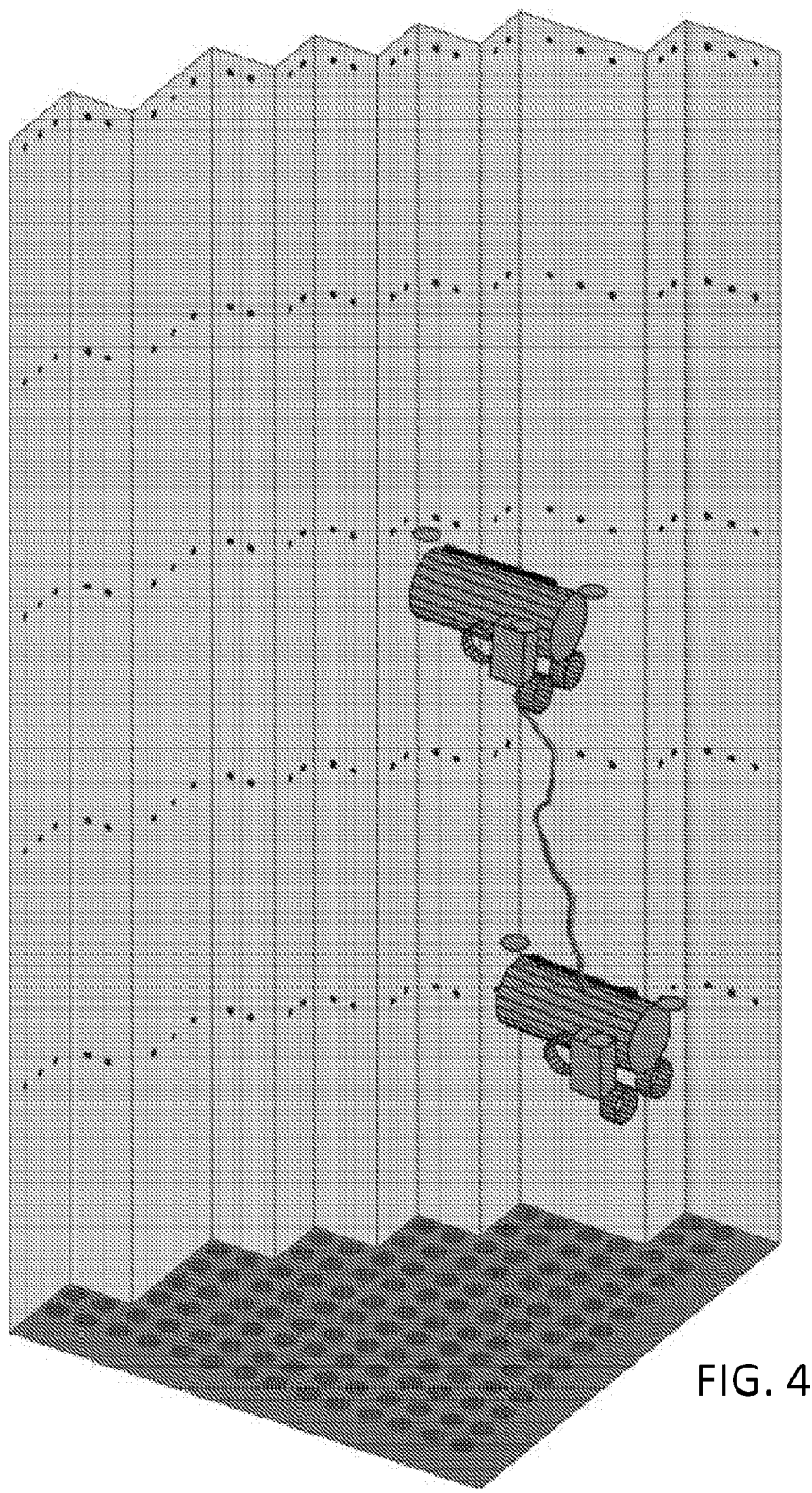
FIG. 4 shows a representation of the interior of a structure being inspected by the robot, showing points and lines used as landmarks on the structure.

Submersible Robot and Fiducial Markers—The submersible robot is preferably equipped with at least three fiducial markers, as shown in FIG. 4, to enable pose estimation from the marker projections in the camera image space. These projections ($m_i=[u_i,v_i]^T=\{1, 2, 3\}$) provide corrections between the external camera and the robot frames. The markers are detected by color and grouping, such as with the K-means clustering algorithm, and assigned based on the estimated robot pose.

The position of the markers with respect to the body frame $\{B\}$, ($M_i^b$), is static and known from robot measurements. Therefore, the projections of these markers in the external camera image space are related as follows:

$$\tilde{m}_i \sim K[R_w^e | t_w^e] T_b^w \tilde{M}_i^b \quad (2)$$

In this model, $T_b^w$ is the rigid body transformation matrix that relates points expressed in the body frame to the world frame, calculated from the robot pose estimate ($p_b^w, \bar{q}_b^w$). Similarly, the extrinsic calibration matrix $[R_w^e, t_b^e]$ is determined from the pose estimate of the external camera ($p_e^w, \bar{q}_e^w$).

Sparse Map from Structural Elements—In the case where the structure is the pressure vessel of a nuclear reactor, the characteristic geometric appearance of the structure can be described as a series of intersecting planes, with landmarks that exist on these planes. These three-dimensional geometric entities (planes and points) form the two types of landmarks that are used for correction in the image space, namely, lines and points. The vessel geometry is specified in the world frame $\{W\}$.

Each plane $\pi=[\bar{n}_T, d]^T \in \mathbb{R}^4$ is described by a unit normal vector. The three-dimensional line that arises from the intersection of two adjacent planes, $\pi_i$ and $\pi_j$, can therefore be represented in Plücker coordinates $\mathcal{L}_{ij}=\pi_i \hat{} \pi_j$, where $\mathcal{L} \in \mathbb{P}^5$.

The infrastructure contains landmarks, as shown in FIG. 4, which are engineered structural elements such as relief holes, cavities, or bolts that can be represented as a three-dimensional point, P. Repeated point elements such as flow holes on the reactor core floor and bolts are prominent. These landmarks exist on a plane, as represented by the $\pi \cdot \tilde{P}=0$, where $\tilde{P} \sim [P^T, 1]^T$ is the three-dimensional point in homogeneous coordinates.

Homography-Based Inference of Camera Rotation—To infer the change in the external camera process, a homography-based methodology is used which leverages image registration. The process change is used by the state estimation framework to drive the system. The pixel coordinates of successive images from the external camera are always related by a homography (projective transformation):

$$\tilde{x}'=H\tilde{x} \quad (3)$$

where $\tilde{x}$ is the homogeneous pixel coordinates, (i.e., $\tilde{x}=[u, v, 1]^T$). This is because the external camera does not experience translation, causing image pixel displacements that do not depend on scene structure. Specifically, this homography H is the infinite homography $H_\infty$ induced by the plane of rotation at infinity. Between frames i and j, this homography may have two structures depending on the process:

$$H_{static} = I_{3 \times 3} \qquad (4)$$

$$H_{rot} = K R_{ij} K^{-1} \qquad (5)$$

The homography, H, is calculated via intensity-based image registration to determine the best similarity matrix, and is utilized to drive the model of the external camera in the state estimation framework.

Projections of Structural Elements—The projections of structural elements that compose the map are observable from the external camera image space. Landmarks (points and lines) are used for correcting the state estimate by identifying and associating them in the image space. These projections are utilized for localization between the robot and the world or for localization between the external camera and the world.

Landmarks are identified and associated first using feature detection based on geometric shape. Specifically, the Hough transform is used to detect lines and circles (points). Points are also detected using genetic blob detection. After detection, data association is performed by first projecting map elements into the image space, and comparing them against candidate detected landmarks. The closest detected landmark (within a heuristic threshold) to a projected landmark is then associated.

Three-dimensional points and their projections in the image space are related by $$\tilde{P}_i \sim K[R_w^e | t_w^e] \tilde{P}_i^w \qquad (6)$$

For lines, the Plücker line $\mathcal{L}_{ij} = \pi_i \hat{} \pi_j$ formed from the intersection of adjacent planes defined in the world coordinate j frame are projected in the external camera image space as a line $l_{ij} \in \mathbb{P}^2$:

$$l_{ij} \sim \mathcal{K} L_w^e \mathcal{L}_{ij}^w, \qquad (7)$$

The matrix $L_w^e$ is the rigid displacement matrix for lines, and $\mathcal{K}$ is the perspective projection matrix for lines.

EKF Methodology—The non-linear state of the system (camera, robot, and map) is estimated using a distinct extended Kalman filter (EKF) with quaternions to obtain a recursive state estimate. This state estimation framework leverages the algorithms described above and requires as priors the position of the fiducial markers on the robot, the vessel geometry as could be obtained from blueprint specifications, and the camera radial and tangential distortion parameters, obtained via a previously known calibration. The external camera images are unwarped following a transformation to reverse any lens distortion. To initialize the filter, the initial position of the external camera and focal length is optimized to minimize the reprojection error between the observed and predicted vessel landmarks. Thereafter, the initial pose of the robot may be estimated from the marker projections from constrained optimization.

System Parameterization—The non-linear state of the inspection system X(t) is estimated via an extended Kalman filter with inputs $u(t) \in \mathbb{R}^3$ and a variable number of measurements z(t), depending on the scene. The system state encompasses the state of the inspection system (robot and external camera) $X_s(t)$ and the map of the vessel $X_M$:

$$X(t) = [X_s(t)^T, X_M^T]^T \qquad (8)$$

Inspection System State—The state of the system is represented by $$X_S(t) = [p_b^w(t)^T, \bar{q}_b^w(t)^T, p_e^{wT}, \bar{q}_e^{-w}(t)_T, f_e(t)^T]^T \qquad (9)$$

where $p_b^w(t) = [x_b^w(t), y_b^w(t), z_b^w(t)]^T$ is the position of the robot with respect to the world frame $(p_e^w = [x_e^w, y_e^w, z_e^w]T)$, $\bar{q}_b^w(t)$ is the orientation of the robot with respect to the world frame; $\bar{q}_e^w(t)$ is the (static) position and orientation of the external camera with respect to the world frame; and $f_e(t) = [f_x(t), f_y(t)]^T$ are the two focal length components.

Map State—The world structure is represented by a map in the state estimate $X_M$ that encompasses the vessel planes and three-dimensional landmarks that exist on these planes. Each plane $\pi = [\bar{n}^T, d]^T$ is described by the unit normal vector $\bar{n}$ and distance d.

A formal representation for utilizing the sparse map in the EKF framework by extending the geometric representation described above is used. Assuming that the walls of the structure are orthogonal to the floor, then planes are specified by their rotational degree of freedom ($\theta$) about the world z-axis and translational degree of freedom (d). Therefore, the unit normal for each wall is $\bar{n} = [\cos \theta, \sin \theta, 0]^T$. For the floor of the vessel, only the height of the vessel h is needed in the state, for $\bar{n} = [0, 0, 1]^T$ and $d = -h$. Therefore, if the vessel consists of N walls, 2N+1 parameters are needed for the planar structure of the vessel.

Although landmark points are three-dimensional, they all must exist on a plane. To enforce the coplanarity of a landmark with its associated plane, a point is represented by two translational degrees of freedom within in the plane, $\delta_1$ and $\delta_2$, relative to the point $-\bar{n}d$, which is the point on the plane closest to the origin of the world frame $\{W\}$. These represent the two-dimensional position of the landmark in the two-dimensional subspace of $\mathbb{R}^3$ formed by $\pi$. When considering $\bar{n}$ as one axis of an orthogonal basis of the plane, the other two axes are $\bar{v}_1 = [-\sin \theta, \cos \theta, 0]^T$ and $\bar{v}_2 = [0, 0, 1]^T$ for walls, and $\bar{v}_1 = [1, 0, 0]^T$ and $\bar{v}_2 = [0, 1, 0]^T$ for the floor.

A landmark's three-dimensional position in the world frame $\{W\}$ can be recovered from its coincident plane and two-dimensional position within this plane:

$$P = -\bar{n}d + \delta_1 \bar{v}_1 + \delta_2 \bar{v}_2 \qquad (10)$$

It follows from (10) that the coplanarity constraint of the landmark, $\pi \cdot \tilde{P} = 0$, is always satisfied for any choice of $\theta$, d, $\delta_1$ or $\delta_2$.

With this minimal geometric representation, the map state $X_M \in \mathbb{R}^{2N+1+2L}$ for N planes and L points is as follows:

$$X_M = [\theta_1, d_1, \ldots, \theta_N, d_N, h, \delta_{1,1}, \delta_{1,2}, \ldots, \delta_{L,1}, \delta_{L,2}]^T \qquad (11)$$

Process Models—The system process model characterizes the temporal evolution of the state. The process input, u(t), consists of the frame-referenced angular velocity of the external camera, $\omega_e^w(t)$. The entire process model is provided by:

$$\dot{p}_b^w(t) = 0 \qquad (12)$$

$$\dot{\bar{q}}_b^w(t) = 0 \qquad (13)$$

$$\dot{p}_e^w = 0 \qquad (14)$$

$$\dot{\bar{q}}_e^w(t) = \frac{1}{2} Q(\omega_e^w(t)) \bar{q}_e^w(t) \qquad (15)$$

$$\dot{f}_e(t) = 0 \qquad (16)$$

$$\dot{\pi} = 0 \qquad (17)$$

$$\dot{P} = 0 \qquad (18)$$

The process of the robot is modeled as random by accounting for state evolution in the process noise. For the external camera process, the position of the external camera $p_e^w$ is static. The external camera rotates with an average angular velocity $\omega_e^w(t)$ determined, from the output of the homography, described above. $Q(\omega(t))$ is the quaternion kinematic matrix that relates angular velocity in a body-referenced frame and quaternion orientation to quaternion rate. Lastly, the map is static as it is defined in the world frame $\{W\}$.

Measurement Models—All system measurements $z(t)$ consist of projections into the external camera image space. The measurements can be categorized into two types: 1) $z_b^e(t)$, relating the robot body frame $\{B\}$ to the external camera frame $\{E\}$; and 2) $z_e^e(t)$, which relates the external camera frame $\{E\}$ to the world frame $\{W\}$:

$$z(t)=[z_b^e(t)^T, z_e^w(t)^T]^T \quad (19)$$

The body-to-external-camera measurements, $z_b^e(t)$, are determined through robot fiducial marker detection:

$$z_b^e(t)=[m_1(t)^T, m_2(t)^T, m_3(t)^T]^T \quad (20)$$

Projections of structural elements provide observations for external camera-to-world localization and robot-to-world localization. While the number of marker corrections is fixed while the robot is in view, the number of landmark corrections varies depending on the number of visible landmarks. A measurement noise $\sigma=3$ is used for all measurements.

Figure 3:
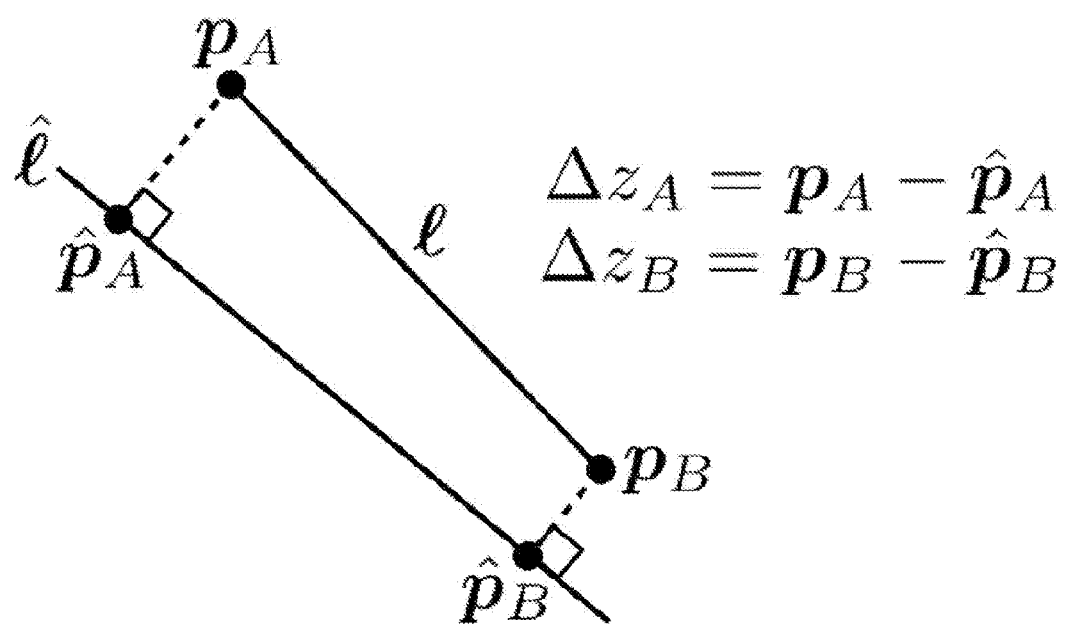
FIG. 3 shows a graphical depiction of a line error formulation.

The predictions for these measurements, $\hat{z}(t)$, utilize an ideal projective camera model as detailed above. For points, the correction model is simply the predicted landmark projection in the image space. For lines, the line error formulation as shown in FIG. 3 is adopted, which is based on the distance from each point of the detected line to its nearest point on the predicted line.

Figure 2:
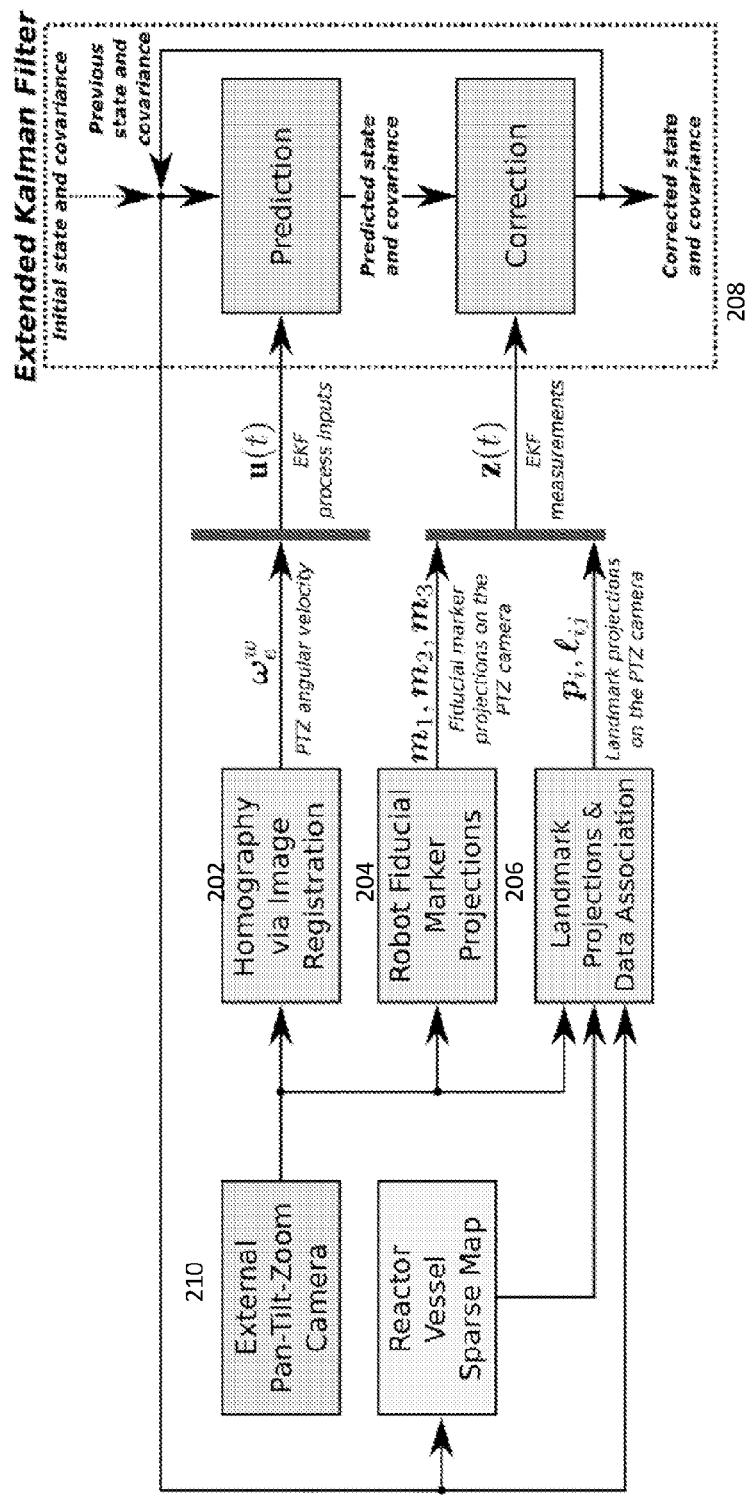
FIG. 2 is a schematic representation of the process and components of the invention.

The process of the invention is shown in schematic form in FIG. 2. Box 202 represents the homography-based inference of camera rotation, as described above. The angular velocity of the camera is calculated from a comparison of two sequential images. A previous and current image are obtained and image registration is performed to determine mathematically how the two images differ. The difference between the images is represented by a 3×3 homography matrix. More specifically, the pixel intensities between two sequential images are compared to determine the 3×3 homography matrix that, when applied to the first image, will produce (as best as possible) the second image. The angular velocity of the camera is then obtained from the terms in the 3×3 homography matrix using equation (6) above.

Boxes 204 and 206 produce projections used to estimate the position and orientation of the robot and PTZ camera in the $\{W\}$ reference frame. A two-dimensional reference frame exists at $\{E\}$. $\{E\}$ represents the environment when viewed in three-dimensions at the camera position and orientation. Capturing an image at $\{E\}$ collapses the three-dimensional content into two-dimensions, providing a two-dimensional reference frame, which is referred to herein as the "camera image space". The fiducials and landmarks are detected and compared in this two-dimensional camera image space. The camera image space is shown in FIG. 1A.

Box 204 represents the robot and fiducial markers process described above. The fiducial markers on the robot are a distinct color from the rest of the image, and so can be identified and tracked in the camera image by color. The fiducials can be seen in FIG. 1A. The identification of the 3 fiducial markers in the camera image produce pixel coordinates (m1, m2, m3) of these markers, which is the output of this box.

Box 206 represents the projections of structural elements described above. In this process, points and lines are detected using various detection algorithms. For points, blob detection is used to find small patches in the image with high image gradient that fit certain geometric properties and the Hough transform is used (a polling based technique that allows for circles to be identified in an image). For lines, the edges of the image are exposed using a Canny image filter, which produces an image where the edges/lines are identified (this is done from inference of the image gradient). Then, the Hough transform is again used, but to detect lines. For each detected point and line, it is determined if the point or line corresponds to an actual three-dimensional point or line on the structure. Within a reactor vessel, points may be, for example, reactor flow holes, bolts, small cavities, etc. (i.e., structural landmarks that are known to exist) and lines may be, for example, the intersection of adjacent reactor planes. The process described allows for robustness as it provides a mechanism for rejecting spurious points or lines that are not associated with any structural element of the reactor. This is determined by using the model of the camera to project known structural elements (that are known to exist in the reactor) into the image, and comparing them in two-dimensions against detected points and lines, so that only detected points and lines that are actually associated with real structural entities are kept.

Box 208 uses an extended Kalman filter to generate the prediction of the next state of the system (and its covariance), as represented by equation (9), which includes the position and orientation of the robot, the position and orientation of the camera, and the focal length or the camera. The predicted state is based on the angular velocity of the camera, which is derived as described above with respect to box 202. The EKF is also used to generate a correction to the prediction, the correction being based on the projections of the fiducial markers, obtained as described above with respect to box 204, and the projections of the landmarks, obtained as described above with respect to box 206, and applied the correction to the predicted state to produce a corrected state (and its covariance). The corrected state is used as the previous state for analysis of the next image captured.

Box 210 represents the PTZ camera, as described above, housed in a watertight housing. Images may be captured at any rate, however, in preferred embodiments of the invention, a 20-25 Hz capture rate was found to be sufficient. Box 212 represents the sparse map of the structure, used as described above.

The invention described herein may be used with any underwater remotely operated vehicle, either controlled by a human operator or automatically controlled. In some instances, a human operator may control the ROV based on feedback from the system described herein, with an output displayed on a monitor showing the opposition and orientation of the ROV with respect to the structure. In other cases, the output of the system may be used directly to automatically operate the ROV.

The system may be implemented by executing software by any known means. The invention is not meant to be limited to particular hardware or software implementations. The scope of the invention is captured in the claims which follow.

We claim:

1. A system for localizing an underwater remotely controlled vehicle moving within a structure filled at least partially with water, comprising:

a map of the structure, the map indicating locations of one or more landmarks defined on the structure;

a pan-tilt-zoom camera, disposed in the water at a stationary position with respect to the structure;

software, executing on a processor, the software iterating a loop performing the functions of:

panning, tilting and zooming the camera to follow a plurality of fiducials mounted on the vehicle;

collecting an image from the camera;

estimating an angular velocity of the camera about a vector comprising a combination of the pan and tilt axes of the camera;

predicting a future state of the system based on a current state of the system and the estimate of the angular velocity;

calculating a correction to the predicted state of the system based on detecting in the collected image, the plurality of fiducials on the vehicle and one or more of the landmarks indicated on the map of the structure;

applying the correction to the predicted state of the system; and using the corrected predicted state as a previous state for a next iteration of the loop;

wherein the predicted state of the system includes at least a position and an orientation of the vehicle with respect to the structure and current pan, tilt and zoom settings of the camera.

2. The system of claim 1 wherein predicting the future state of the system is further based on one or more additional terms representing the focal length of the camera.

3. The system of claim 1 wherein predicting the future state of the system produces a predicted state and a covariance of the predicted state.

4. The system of claim 3 wherein applying the corrected state to the predicted state produces a corrected state and a covariance of the corrected state.

5. The system of claim 1 wherein the estimate of the angular velocity of the camera is based on a comparison of the collected image with one or more previous images.

6. The system of claim 5 wherein estimating the angular velocity of the camera uses image registration in a homography-based method.

7. The system of claim 6 wherein the image registration is intensity-based.

8. The system of claim 1 wherein the estimate of the angular velocity of the camera is based on pan and tilt angles reported by the camera.

9. The system of claim 1 wherein detecting the one or more landmarks defined on the structure from the collected image uses the map of the structure and a previous state of the system as inputs.

10. The system of claim 1 wherein the software performs the further function of detecting the one or more landmarks defined on the structure and updating the map of the structure by updating a position of the one or more detected landmarks.

11. The system of claim 10 wherein the one or more landmarks are defined points or lines on the structure.

12. The system of claim 11 wherein the map of the structure consists of a series of intersecting planes.

13. The system of claim 12 wherein the lines represent the intersections between the planes.

14. The system of claim 1 wherein the software performs the further function of determining an initial position and initial orientation of the camera.

15. The system of claim 1 wherein the software performs the further function of determining an initial location of the vehicle.

16. The system of claim 1 wherein the software performs the further function of suspending tracking and attempting to re-acquire the vehicle when tracking of the vehicle is determined to have been lost.

17. The system of claim 4 wherein the software uses an extended Kalman filter to determine the predicted state and the covariance of the predicted state and the corrected state and the covariance of the corrected state.

18. The system of claim 1 wherein the camera is enclosed in a watertight housing.

19. The system of claim 18 wherein the housing is disposed at a fixed location relative to the structure and the vehicle.

20. The system of claim 1 wherein the detected landmarks are projected from a frame representing the structure to a frame representing an optical center of the camera.

21. The system of claim 1 wherein the one or more landmarks are detected in the image using feature detection based on geometric shape.

* * * * *